(12) United States Patent
Jung et al.

(10) Patent No.: US 11,725,142 B2
(45) Date of Patent: Aug. 15, 2023

(54) QUANTUM DOTS AND PREPARATION METHOD THEREOF, AND OPTICAL MEMBER AND ELECTRONIC DEVICE EACH INCLUDING QUANTUM DOTS

(71) Applicant: Samsung Display Co., Ltd., Yongin-si (KR)

(72) Inventors: Junehyuk Jung, Yongin-si (KR); Seungwon Park, Yongin-si (KR); Junghoon Song, Yongin-si (KR); Baekhee Lee, Yongin-si (KR); Junwoo Lee, Yongin-si (KR); Jaebok Chang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 41 days.

(21) Appl. No.: 17/546,882

(22) Filed: Dec. 9, 2021

(65) Prior Publication Data

US 2022/0204843 A1 Jun. 30, 2022

(30) Foreign Application Priority Data

Dec. 29, 2020 (KR) .................. 10-2020-0186767

(51) Int. Cl.
*C09K 11/88* (2006.01)
*C09K 11/08* (2006.01)
(Continued)

(52) U.S. Cl.
CPC ........ *C09K 11/883* (2013.01); *C09K 11/0883* (2013.01); *C09K 11/7492* (2013.01);
(Continued)

(58) Field of Classification Search
CPC .............. C09K 11/883; C09K 11/0883; C09K 11/7492; C09K 11/75
See application file for complete search history.

(56) References Cited

U.S. PATENT DOCUMENTS 10,316,250 B2 6/2019 Guo et al.
10,581,008 B2 3/2020 Lee et al.
(Continued)

FOREIGN PATENT DOCUMENTS

CN 112143482 * 12/2020
KR 10-1739751 B1 5/2017

OTHER PUBLICATIONS

Seo, et al., "Unprecedented surface stabilized InP quantum dots with bidentate ligands," *RSC Adv.*, 2020, 10, 11517-11523.
(Continued)

*Primary Examiner* — C Melissa Koslow
(74) *Attorney, Agent, or Firm* — Lewis Roca Rothgerber Christie LLP

(57) ABSTRACT

A quantum dot, a method of preparing the quantum dot, and an optical member and an electronic device, each including the quantum dot, are provided. The quantum dot includes: a core including a Group III-V semiconductor compound alloyed with gallium (Ga); a first shell surrounding the core; and a second shell surrounding the first shell, wherein the first shell includes a first compound that includes a Group II-VI semiconductor compound, a Group III-V semiconductor compound, or a Group III-VI semiconductor compound, the second shell includes a second compound that includes a Group II-VI semiconductor compound, a Group III-V semiconductor compound, or a Group III-VI semiconductor compound, the first compound and the second compound are different from each other, and the atomic percentages of specific elements in a material of the core, elemental ratios in the first shell and second shell with respect to the core satisfy certain ranges.

20 Claims, 3 Drawing Sheets

(51) Int. Cl.
   *C09K 11/75*   (2006.01)
   *C09K 11/74*   (2006.01)
   *B82Y 40/00*   (2011.01)
   *B82Y 20/00*   (2011.01)

(52) U.S. Cl.
   CPC ............. *C09K 11/75* (2013.01); *B82Y 20/00* (2013.01); *B82Y 40/00* (2013.01)

(56) References Cited

U.S. PATENT DOCUMENTS

| | | |
|---|---|---|
| 10,590,340 B2 | 3/2020 | Jang et al. |
| 2017/0250322 A1 | 8/2017 | Wang et al. |
| 2020/0325395 A1* | 10/2020 | Curley ................... C09K 11/56 |

OTHER PUBLICATIONS

Ippen, et al., "InP/ZnSe/ZnS: A Novel Multishell System of InP Quantum Dots for Improved Luminescence Efficiency and Its application in a Light-Emitting Device," *J. Inf. Display*, vol. 13, No. 2, Jun. 2012, 91-95.

* cited by examiner

5 ATOMIC %          30 ATOMIC %

QUANTUM DOTS AND PREPARATION METHOD THEREOF, AND OPTICAL MEMBER AND ELECTRONIC DEVICE EACH INCLUDING QUANTUM DOTS

CROSS-REFERENCE TO RELATED APPLICATION

This application claims priority to and the benefit of Korean Patent Application No. 10-2020-0186767, filed on Dec. 29, 2020, in the Korean Intellectual Property Office, the entire content of which is incorporated herein by reference.

BACKGROUND

1. Field

One or more aspects of embodiments of the present disclosure relate to quantum dots and a method of preparing the same, and an optical member and an electronic device, each including the quantum dots.

2. Description of the Related Art

Quantum dots, which are nanocrystals of semiconductor materials, exhibit a quantum confinement effect. When quantum dots receive light from an excitation source and reach an energetic excited state, the quantum dots may spontaneously emit energy (e.g., light energy or a photon) corresponding to an energy band gap of the quantum dots. In this regard, even when particles are formed (composed) of the same material, the wavelength of light emitted by the particles may vary according to the particle size, and accordingly, light having a desired or suitable wavelength range may be obtained by adjusting the size of the quantum dots, so that excellent or suitable color purity and/or high luminescence efficiency may be obtained. Thus, quantum dots may be applicable to various suitable devices or apparatuses.

Quantum dots may be utilized to perform various optical functions (for example, a photo-conversion function) in optical members. For example, an optical member including quantum dots may have the form of a thin film, for example, a thin film patterned for each subpixel. Such an optical member may be utilized as a color conversion member of an apparatus including one or more light sources.

With respect to quantum dots included in color conversion members in the art, InP-based quantum dots are mainly utilized. However, due to the low blue light absorption rate of InP-based quantum dots, color conversion members in the art utilize a color conversion member including a large quantity of quantum dots, or additionally arrange a blue light blocking film on a color conversion member, which are disadvantageous.

SUMMARY

One or more aspects of embodiments of the present disclosure are directed toward quantum dots having an improved weight absorption coefficient, a method of preparing the same, an optical member including the quantum dots, and a device including the quantum dots.

Additional aspects will be set forth in part in the description which follows and, in part, will be apparent from the description, or may be learned by practice of the presented embodiments of the disclosure.

One or more embodiments of the present disclosure provide a quantum dot including a core including a Group III-V semiconductor compound alloyed with gallium (Ga), a first shell around (e.g., surrounding) the core, and a second shell around (e.g., surrounding) the first shell, wherein the first shell includes a first compound that includes a Group II-VI semiconductor compound, a Group III-V semiconductor compound, or a Group III-VI semiconductor compound, the second shell includes a second compound that includes a Group II-VI semiconductor compound, a Group III-V semiconductor compound, or a Group III-VI semiconductor compound, the first compound and the second compound are different from each other, an atomic percentage of gallium in the core to the Group III element excluding Ga in the core (e.g., the Group III element included in the Group III-V semiconductor compound) is 25 atomic % to 30 atomic %, an atomic percentage of the Group V or VI element in the first shell to the Group III element in the core is 5 atomic % to 50 atomic %, and an atomic percentage of the Group V or VI element in the second shell to the Group III element in the core is 5 atomic % to 50 atomic %.

One or more embodiments of the present disclosure provide a method of preparing the quantum dots, the method including: preparing a first mixture in which a core, which includes a Group III-V semiconductor compound alloyed with gallium (Ga), is dispersed at a concentration of 0.1 mM to 100 mM in an organic solvent, forming a first shell by reacting a second mixture in which a first precursor, which includes a Group V element or a Group VI element, and a second precursor, which includes a Group II element or a Group III element, are added to the first mixture; and forming a second shell by reacting a third mixture in which a third precursor, which includes a Group V element or a Group VI element, and a fourth precursor, which includes a Group II element or a Group III element, are added to the second mixture, wherein an atomic percentage (%) of gallium in the core to the Group III element excluding Ga is 25 atomic % to 30 atomic %, the first precursor and the third precursor are different from each other, the first shell includes a Group II-VI semiconductor compound, a Group III-V semiconductor compound, or a Group III-VI semiconductor compound, and the second shell includes a Group II-VI semiconductor compound, a Group III-V semiconductor compound, or a Group III-VI semiconductor compound.

One or more embodiments of the present disclosure provide an optical member including the quantum dot.

One or more embodiments of the present disclosure provide an electronic device including the quantum dot.

BRIEF DESCRIPTION OF THE DRAWINGS

The above and other aspects, features, and advantages of selected embodiments of the disclosure will be more apparent from the following description taken in conjunction with the accompanying drawings, in which.

DETAILED DESCRIPTION

Figure 1:
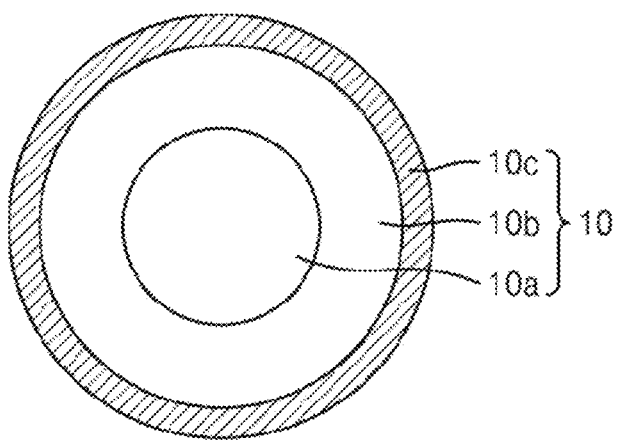
FIG. 1 is a schematic view showing a structure of a quantum dot according to an embodiment.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Throughout the disclosure, the expressions "at least one of a, b and c," "at least one of a, b or c," and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof.

Because the present disclosure is capable of various suitable transformations and may have various suitable embodiments, selected embodiments will be illustrated in the drawings and will be described in more detail in the detailed description. The effects and features of the present disclosure, and methods of achieving them will become clear with reference to the embodiments described in more detail together with the drawings. However, the present disclosure is not limited to the following embodiments, and may be implemented in various suitable forms.

As used herein, the terms "first," "second," and/or the like do not limit the associated components, but are used for the purpose of distinguishing one component from another.

As used herein, the singular forms "a," "an" and "the" are intended to include the plural forms as well, unless the context clearly indicates otherwise.

As used herein, terms such as "comprise," "include," "have," and/or the like specify the presence of stated features, integers, processes, operations, elements, components, and/or combinations thereof, but do not preclude the presence or addition of one or more other features, integers, processes, operations, elements, components, and/or combinations thereof. For example, terms such as "comprise," "include," "have," and/or the like, unless otherwise limited, may refer to a case of consisting of only the features and/or components described in the specification, and a case of further including other features and/or components.

As used herein, the terms "use," "using," and "used" may be considered synonymous with the terms "utilize," "utilizing," and "utilized," respectively. Expressions such as "at least one of," "one of," and "selected from," when preceding a list of elements, modify the entire list of elements and do not modify the individual elements of the list. The term "and/or" includes any and all combinations of one or more of the associated listed items. Further, the use of "may" when describing embodiments of the present disclosure refers to "one or more embodiments of the present disclosure".

As used herein, "Group II elements" may include a Group IIA element and/or a Group IIB element of the IUPAC periodic table of the elements. Examples of a Group II element may include magnesium (Mg) and/or zinc (Zn), but are not limited thereto.

As used herein, "Group III elements" may include a Group IIIA element and a Group IIIB element of the IUPAC periodic table of the elements. Examples of a Group III element may include aluminum (Al), indium (In), gallium (Ga), and/or thallium (Tl), but are not limited thereto.

As used herein, "Group V elements" may include a Group VA element and/or a Group VB element of the IUPAC periodic table of the elements. Examples of a Group V element may include phosphorous (P), arsenic (As), and/or antimony (Sb), but are not limited thereto.

As used herein, "Group VI elements" may include a Group VIA element and/or a Group VIB element of the IUPAC periodic table of the elements. Examples of a Group VI element may include oxygen (O), sulfur (S), selenium (Se), and/or tellurium (Te), but are not limited thereto.

As used herein, "atomic percentage" refers to a percentage of the number of atoms of a first atom (element) with respect to the number of atoms of a second atom (element), for example, a ratio of the number of atoms of a first element to 100 atoms of a second element.

As used herein, "sphericity" is a measure indicative of the degree of sphericity (roundness) of an object and a measure of shape compactness. According to Wadell, H., "Volume, Shape, and Roundness of Quartz Particles," *J. of Geology* 43:250-280 (1935), the sphericity ($\psi$) of a particle is defined by Equation 1:

$$\psi = (\pi^{1/3}(6V_p)^{2/3})/A_p. \quad \text{Equation 1}$$

In Equation 1, $V_p$ is the volume of the particle, and $A_p$ is the surface area of the particle. A sphere (e.g., ideal sphere) has a sphericity of 1, and any non-spherical particles have a sphericity less than 1.

As used herein, "weight absorption coefficient" or "mass extinction coefficient" is a coefficient for quantifying the absorption of light of a specific wavelength by a given mass (weight) of quantum dots, and is calculated on the basis of the Lambert-Beer law using the following equation. As used herein, "weight" or "mass" in the terms "weight absorption coefficient" or "mass extinction coefficient" may refer to weight in grams. The weight absorption coefficient is defined by Equation 2:

$$\text{Weight absorption coefficient}(a) = A/c \cdot L. \quad \text{Equation 2}$$

In Equation 2, A is absorbance, c is the concentration of a sample solution (g/mL), and L is the length of the sample solution (cm).

As used herein, the terms "quantum efficiency" and "luminescence efficiency" may be used interchangeably.

Hereinafter, embodiments of a quantum dot 10 and a method of preparing the same will be described with reference to FIG. 1.

Quantum Dot 10

According to an embodiment, the quantum dot includes: a core 10a including a Group III-V semiconductor compound alloyed with gallium (Ga); a first shell 10b surrounding the core 10a; and a second shell 10c surrounding the first shell 10b, wherein the first shell 10b includes a first compound, which may include Group II-VI semiconductor compound, a Group III-V semiconductor compound, or a Group III-VI semiconductor compound, the second shell 10c includes a second compound, which may include a Group II-VI semiconductor compound, a Group III-V semiconductor compound, or a Group III-VI semiconductor compound, and the first compound and the second compound are different from each other (e.g., the composition of the second shell 10c is different from that of the first shell 10b), and an atomic percentage (%) of Ga in the core 10a with respect to the Group III element excluding Ga in the core 10a (e.g., the Group III element included in the Group III-V semiconductor compound) may be about 25 atomic % to about 30 atomic %. For example, the number of atoms of Ga in the core 10a may be about 25 atomic % to about 30 atomic % based on the number of atoms of the Group III element excluding Ga in the core 10a.

The amounts of Ga and the Group III element in the core 10a may each be measured by qualitative and/or quantitative analysis of the elements constituting a sample, for example through analysis of binding energy as measured utilizing X-ray photoelectron spectroscopy (XPS). However, embodiments are not limited thereto.

In one or more embodiments, the Group III-V semiconductor compound alloyed with Ga may include InGaP. For example, an atomic percentage of Ga with respect to In (e.g., Ga/In) in the core 10a including InGaP may be about 25 atomic % to about 30 atomic %.

In a quantum dot having a core/shell structure with a too large bandgap (e.g., bandgap difference) between the core and the shell, the quantum dot may have reduced quantum efficiency and/or stability. For example, in a quantum dot structure such as InP/ZnSe, the quality of the quantum dot may deteriorate due to a lattice defect caused by the large bandgap difference between InP as a core material and ZnSe as a shell material. When Ga is present in the lattice of the Group III-V semiconductor compound, the band gap is increased as compared with the pure Group III-V semiconductor compound. Thus, the quantum dot 10 according to an embodiment may have a reduced band gap difference between the material of the core 10a and the material of the first shell 10b surrounding the core 10a, and thus have improved quantum efficiency, stability, and/or color reproducibility.

When a bandgap difference between the material of the core 10a and the material of the first shell 10b is too small (e.g., insufficient), the luminescence efficiency, weight absorption coefficient, and/or the like of the quantum dot 10 may be deteriorated. By the inclusion of the core 10a including the Group III-V semiconductor compound alloyed with Ga, the quantum dot 10 according to one or more embodiments may optimize or improve the bandgap difference between the material of the core 10a and the material of the first shell 10b. Further, when the amount of Ga in the core 10a is controlled or selected to be within the above-described range, the quantum dot 10 according to one or more embodiments may have high quantum efficiency, photochemical stability and/or color reproducibility.

The quantum dot 10 according to one or more embodiments may satisfy the above-described range of the amount of Ga in the core 10a, and may thus have a high weight absorption coefficient. For example, the quantum dot 10 may have a higher weight absorption coefficient than a quantum dot including a Group III-V based core that does not include Ga. Accordingly, the quantum dot 10 may exhibit a high quantum efficiency and/or color reproducibility, and/or may have a high color conversion efficiency when applied to an optical member (for example, a color conversion member).

For example, when an atomic percentage of Ga in the core 10a to the Group III element excluding Ga in the core 10a is 25 atomic % or greater, the quantum dot 10 may have a high weight absorption coefficient (@450 nm), and thus may effectively absorb blue light from a light source. When an atomic percentage of Ga in the core 10a to the Group III element excluding Ga in the core 10a is 30 atomic % or less, because the surface defect density of the alloy core is low, an error in light emission peak may be minimized or reduced, and a high color purity may be exhibited.

In one or more embodiments, the Group III-V semiconductor compound alloyed with Ga may have an absorption peak (e.g., peak absorption wavelength) of about 420 nm to about 435 nm. For example, in an absorption spectrum of the Group III-V semiconductor compound alloyed with Ga, a first exciton absorption peak may have a wavelength of about 420 nm to about 435 nm. Accordingly, the Group III-V semiconductor compound alloyed with Ga may be to absorb blue light in the above-described wavelength range and may be to emit green light or red light. An emission wavelength of the light emitted by the quantum dot 10 may be controlled or selected by adjusting the thickness of the shell(s) (e.g., the first shell 10b and/or the second shell 10c), the size of the quantum dot 10, and/or the like.

In one or more embodiments, in the absorption spectrum of the Group III-V semiconductor compound alloyed with Ga, a first exciton region may have a valley-to-peak ratio (V to P) of 0.6 to 0.8. When a minimum absorbance at a valley region in the first exciton region of the absorption spectrum of the Group III-V semiconductor compound alloyed with Ga is defined as A, and a maximum absorbance at a peak region is defined as B, the result of dividing A by B is defined as a valley-to-peak ratio. When the valley-to-peak ratio of the Group III-V semiconductor compound alloyed with Ga satisfies the above-described range, the quantum dot 10 may have a high quantum efficiency and a narrow full width at half maximum (FWHM). Further, when the valley-to-peak ratio satisfies the above-described range, a plurality of quantum dots 10 may have a dense distribution (e.g., narrow size distribution) of particles and a substantially uniform energy band distribution.

When the first shell 10b and the second shell 10c each independently include a Group III-V semiconductor compound, the Group III-V semiconductor compound of the core 10a may be different from the Group III-V semiconductor compound of the first shell 10b and the Group III-V semiconductor compound of the second shell 10c.

In one or more embodiments, as the materials of the first shell 10b and the second shell 10c, the Group II-VI semiconductor compound may include ZnSe, ZnS, ZnTe, ZnO, ZnMgSe, ZnMgS, or any combination thereof, the Group III-V semiconductor compound may include GaP, GaAs, GaSb, InAs, InSb, AlP, AlAs, AlSb, or any combination thereof, and the Group III-VI semiconductor compound may include GaSe, GaTe, or any combination thereof.

In one or more embodiments, the first shell 10b may include ZnSe, and the second shell 10c may include ZnS.

An atomic percentage of a Group V or VI element in the first shell 10b with respect to the Group III element in the core 10a may be about 5 atomic % to about 50 atomic %. The number of atoms of a Group V or VI element in the first shell 10b on the basis of the number of atoms of the Group III element in the core 10a may be about 5 atomic % to about 50 atomic %.

An atomic percentage of the Group V or VI element in the second shell 10c with respect to the Group III element in the core 10a may be about 5 atomic % to about 50 atomic %. For example, the number of atoms of a Group V or VI element in the second shell 10c on the basis of the number of atoms of the Group III element in the core 10a may be about 5 atomic % to about 50 atomic %.

The thickness of the shell of the quantum dot 10 may vary (e.g., may be selected) according to an atomic percentage of the Group V or Group VI element in the shell with respect to the Group III element in the core 10a. When the amount of Group V or Group VI element in each shell relative to the amount of Group III element in the core 10a satisfies the above-described ranges, the thickness of each shell may be controlled or selected to be within a desired or suitable range, and thus the quantum dot 10 may have a high sphericity and weight absorption coefficient.

For example, the amounts of the Group V or VI element in the first shell 10b and the second shell 10c may be measured by qualitative and quantitative analysis of the elements of samples, for example through analysis of the binding energy as measured utilizing X-ray photoelectron spectroscopy (XPS).

For example, the core 10a may include InGaP, the first shell 10b may include ZnSe, the second shell 10c may include ZnS, an atomic percentage of Se in the first shell 10b with respect to In in the core 10a may be about 5 atomic % to about 50 atomic %, and an atomic percentage of S in the second shell 10c with respect to In in the core 10a may be about 5 atomic % to about 50 atomic %.

For example, the smaller the amount (number of atoms or atomic percentage) of the Group V or VI element in the first shell 10b and/or the second shell 10c with respect to the number of atoms of a Group III element in the core 10a, the higher the sphericity of the quantum dot 10. However, embodiments are not limited thereto.

Figure 2:
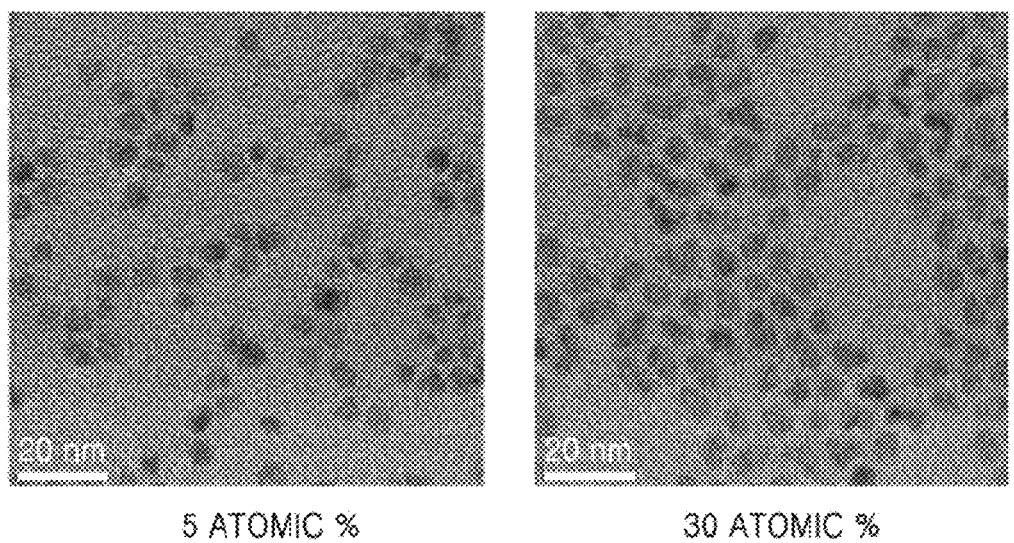
FIG. 2 shows transmission electron microscope (TEM) images of quantum dots according to an embodiment.

FIG. 2 shows transmission electron microscopy (TEM) images of quantum dots according to embodiments having a InGaP/ZnSe/ZnS structure (e.g., with an InGaP core on which shells of ZnSe and ZnS are sequentially formed), having an atomic percentage of Se (or S) to In of 5 atomic % or an atomic percentage of Se (or S) to In of 30 atomic %. It was found from FIG. 2 that the quantum dots having 5 atomic % of Se (or S) to In exhibited a higher sphericity than those having 30 atomic % of Se (or S) to In.

In one or more embodiments, an atomic percentage of the Group V or VI element in the first shell 10b to the Group III element in the core 10a may be about 10 atomic % to about 15 atomic %, and an atomic percentage of the Group V or VI element in the second shell 10c to the Group III element in the core 10a may be about 10 atomic % to about 15 atomic %. When the amount of Group V or VI element in each shell of the quantum dot 10 satisfies the above-described range, the quantum dot 10 may have high sphericity and a high weight absorption coefficient.

In one or more embodiments, the first shell 10b and the second shell 10c may each independently include a different Group II-VI semiconductor compound, an atomic percentage of the Group VI element in the first shell 10b to the Group III element in the core 10a may be about 10 atomic % to about 15 atomic %, and an atomic percentage of the Group VI element in the second shell 10c to the Group III element in the core 10a may be about 10 atomic % to about 15 atomic %. When the amount of Group VI element in each shell of the quantum dot 10 satisfies the above-described ranges, the quantum dot 10 may have a high weight absorption coefficient.

For example, the core 10a may include InGaP, the first shell 10b may include ZnSe, the second shell 10c may include ZnS, an atomic percentage of Se in the first shell 10b to In in the core 10a may be about 10 atomic % to about 15 atomic %, and an atomic percentage of S in the second shell 10c to In in the core 10a may be about 10 atomic % to about 15 atomic %.

In one or more embodiments, the quantum dot 10 may further include a ligand chemically bound to the surface thereof. The ligand may be chemically bound to the surface of the quantum dot 10 to passivate the quantum dot 10. For example, the quantum dot 10 may further include a ligand chemically bound to the second shell 10c.

The ligand may include an organic ligand or a metal halide.

For example, the organic ligand may include oleic acid, oleylamine, octylamine, decylamine, trioctylamine, hexadecylamine, mercapto-propionic acid, dodecanethiol, 1-octanethiol, thionyl chloride, trioctylphosphine, trioctylphosphine oxide, hexylphosphonic acid, tetradecylphosphonic acid, octylphosphonic acid, or any combination thereof.

In one or more embodiments, the quantum dot 10 may have a weight absorption coefficient of about 350 to about 1,000 mL·g$^{-1}$·cm$^{-1}$ at a wavelength of 450 nm. For example the quantum dot 10 may have a weight absorption coefficient of about 500 to about 1,000 mL·g$^{-1}$·cm$^{-1}$ at a wavelength of 450 nm. When the weight absorption coefficient of the quantum dot 10 satisfies the above-described ranges, the quantum dot 10 may have a high absorbance of blue light. Accordingly, when applied to an optical member, for example, a color conversion member, the quantum dot 10 may have a high color convention efficiency.

In one or more embodiments, the quantum dot 10 may have a sphericity of about 0.7 to about 1.0. For example, the quantum dot 10 may have a sphericity of about 0.7 to about 0.9.

As a method for measuring the sphericity of the quantum dot 10, any suitable method in the art may be utilized. For example, the sphericity of the quantum dot 10 may be measured utilizing transmission electron microscopy (TEM) images. TEM is an imaging technique in which electron beams are directed to pass through a sample to form an image, and the image is magnified to appear on a fluorescent screen or a photographic film layer or detected with a sensor such as a charge-coupled device (CCD) camera. Using TEM, information such as the particle diameter, particle size distribution, and/or particle shape of nanoparticles can be calculated.

In one or more embodiments, the sphericity of the quantum dot 10 may be measured by TEM and image observation with an image analysis tool (e.g., software). However, embodiments are not limited thereto.

In one or more embodiments, the quantum dot 10 may have a quantum efficiency of about 90% or greater, for example, about 92% or greater.

The quantum dot 10 may be to emit visible light other than blue light. For example, the quantum dot 10 may be to emit light having a maximum emission wavelength of about 495 nm to about 750 nm. Accordingly, the quantum dot 10 may be designed to absorb blue light and emit green light or red light when applied to an optical member, for example, a color conversion member.

In one or more embodiments, the quantum dot 10 may be to emit green light having a maximum emission wavelength of about 495 nm to about 570 nm, for example, about 500 nm to about 550 nm, or about 520 nm to about 530 nm. In other embodiments, the quantum dot 10 may be to emit red light having a maximum emission wavelength of about 630 nm to about 750 nm, for example, about 630 nm to about 700 nm, or about 630 nm to about 680 nm. Accordingly, for example, when applied to a color conversion member, the quantum dot 10 may implement green or red color having a high luminance and a high color purity.

In one or more embodiments, a photoluminescence (PL) spectrum of the quantum dot 10 may have a maximum emission wavelength of about 495 nm to about 750 nm. For example, a PL spectrum of the quantum dot 10 may have a maximum emission wavelength of about 495 nm to about 570 nm, for example, about 500 nm to about 550 nm, or about 520 nm to about 530 nm. Accordingly, for example, when the quantum dot 10 is applied to a color conversion member, the color conversion member may provide green color light having a high color purity. In other embodiments, a PL spectrum of the quantum dot 10 may have a maximum emission wavelength of about 630 nm to about 750 nm, for example, about 630 nm to about 700, or about 630 nm to about 680 nm. Accordingly, for example, when the quantum dot 10 is applied to a color conversion member, the color conversion member may provide red color light having a high color purity.

For example, when an atomic percentage of Ga/Group III element excluding Ga (Ga to Group III element excluding Ga) in the core 10a satisfies the above-described ranges, a maximum emission wavelength of the PL spectrum may be about 525 nm to about 530 nm. Accordingly, the quantum dot 10 may be to emit green light having a high color purity.

In one or more embodiments, a PL spectrum of the quantum dot 10 may have a full width at half maximum (FWHM) of 40 nm or less. When a FWHM of the quantum dot 10 satisfies the above-described range, the quantum dot 10 may provide excellent or suitable color purity and/or color reproducibility, and/or an improved viewing angle.

In one or more embodiments, the first shell 10b may have a thickness of about 0.5 nm to about 3 nm, for example, about 0.5 nm to about 2 nm. However, embodiments are not limited thereto. When the thickness of the first shell 10b satisfies the above-described ranges, the quantum dot 10 may have a high sphericity and a high weight absorption coefficient.

In one or more embodiments, the second shell 10c may have a thickness of about 0.5 nm to about 4 nm, for example, about 0.5 nm to about 1 nm. However, embodiments are not limited thereto. When the thickness of the second shell 10c satisfies the above-described ranges, the quantum dot 10 may have high sphericity and a high weight absorption coefficient.

The thickness of the first shell 10b and the thickness of the second shell 10c may each independently vary according to an amount of Group V or VI element in each shell relative to the amount of Group III element of the core 10a. For example, the higher the amount of Group V or VI element in each shell relative to the amount of Group III element in the core becomes, the larger the thickness of each shell becomes (e.g., the thickness of each shell tends to increase). However, embodiments are not limited thereto.

In one or more embodiments, the quantum dot 10 may further include, at an interface between the first shell 10b and the second shell 10c, a mixed layer in which the material of the first shell 10b and the material of the second shell 10c are mixed. The mixed layer may have a concentration gradient in which the concentration of the material of the first shell 10b and/or the material of the second shell 10c increases or decreases toward the center (e.g., of the quantum dot 10). For example, the concentration of the material of the first shell 10b in the mixed layer may increase toward the central direction. For another example, the concentration of the material of the second shell 10c in the mixed layer may decrease toward the central direction.

In one or more embodiments, the quantum dot 10 may have an average particle diameter of about 1 nm to about 20 nm. For example, the quantum dot 10 may have an average particle diameter of about 3 nm to about 13 nm, about 4 nm to about 12 nm, about 4 nm to about 8 nm, about 5 nm to about 11 nm, about 6 nm to about 10 nm, or about 7 nm to about 9 nm. When the quantum dot 10 satisfies the average particle diameter range as above, the quantum dot 10 may not only exhibit a feature behavior as quantum dots, but also exhibit excellent or suitable dispersibility in a composition for pattern formation. In some embodiments, by selecting one or more suitable average particle diameters of the quantum dots 10 within the ranges as described above, the emission wavelength and/or semi-conductive characteristics of the quantum dots 10 may be variously changed.

The shape of the quantum dot 10 is not specifically limited, and may be any one commonly utilized in the art. For example, the quantum dot 10 may be in the form of spherical, pyramidal, multi-armed, or cubic nanoparticles, nanotubes, nanowires, nanofibers, or nanoplates.

In one or more embodiments, the quantum dot 10 may have a spherical form.

The quantum dot 10 may be synthesized by a variety of methods (such as a wet chemical process, a metal organic chemical vapor deposition (MOCVD) and/or molecular-beam epitaxy (MBE) process).

The first shell 10b and the second shell 10c of the quantum dot 10 may each serve as a protective layer for preventing or reducing chemical denaturation of the core 10a, and/or as a charging layer for imparting electrophoretic characteristics to the quantum dot 10.

In one or more embodiments, the first shell 10b and/or the second shell 10c may further include a metal or non-metal oxide, a semiconductor compound, or a combination thereof.

Method of Preparing Quantum Dot 10

Hereinafter, a method of preparing the quantum dot 10 according to the above-described embodiments will be described in more detail.

A method of preparing the quantum dot 10 according to an embodiment may include: preparing a first mixture in which a core 10a including a Group III-V semiconductor compound alloyed with Ga is dispersed at a concentration of 0.1 mM to 100 mM in an organic solvent; forming the first shell 10b by reacting a second mixture in which a first precursor including a Group V or VI element and a second precursor including a Group II or III element are added to the first mixture; and forming the second shell 10c by reacting a third mixture in which a third precursor including a Group V or VI element and a fourth precursor including a Group II or III element are added to the second mixture, wherein an atomic percentage (%) of Ga to the Group III element excluding Ga in the core 10a may be 25 atomic % to 30 atomic %, the first precursor and the third precursor may be different from each other, the first shell 10b may include a first compound including a Group II-VI semiconductor compound, a Group III-V semiconductor compound, or a Group III-VI semiconductor compound, and the second shell 10c may include a second compound including a Group II-VI semiconductor compound, a Group III-V semiconductor compound, or a Group III-VI semiconductor compound.

The synthesis method utilized for the core 10a may be any suitable method in the art.

In one or more embodiments, the organic solvent may include trioctylamine, 1-nonadecene, 1-octadecene, 1-heptadecene, 1-hexadecene, 1-pentadecene, 1-tetradecene, or any combination thereof. For example, the organic solvent may include trioctylamine or 1-octadecene.

In one or more embodiments, the first mixture may further include a dispersant. The dispersant enables the core 10a to be uniformly dispersed in the organic solvent. The dispersant may include an anionic, cationic, or non-ionic polymer material.

The amount of the dispersant may be about 10 to 50 parts by weight, for example, about 15 parts by weight to about 30 parts by weight, with respect to 100 parts by weight of the quantum dots 10. When the amount of the dispersant satisfies these ranges, the quantum dots 10 may be uniformly dispersed in the first mixture.

In the method of preparing the quantum dot 10 according to one or more embodiments, by adjustment of the concentration of the core 10a in the first mixture to be 0.1 mM to 100 mM, a sphericity and a weight absorption coefficient of the quantum dot 10 may be controlled or selected to be within a desired or suitable range.

For example, when the concentration of the core 10a in the first mixture is about 0.1 mM to about 1 mM, the prepared quantum dot 10 may have a sphericity of about 0.9 or more. For another example, when the concentration of the core 10a in the first mixture is about 1 mM to about 100 mM, the prepared quantum dot 10 may have a sphericity of about 0.7 to about 0.9.

When the concentration of the core 10a in the first mixture satisfies these ranges, the prepared quantum dot 10 may have a weight absorption coefficient of about 350 to about 1000 $mL \cdot g^{-1} \cdot cm^{-1}$ at a wavelength of 450 nm.

In one or more embodiments, the Group III-V semiconductor compound alloyed with Ga may include InGaP.

Figure 3A:
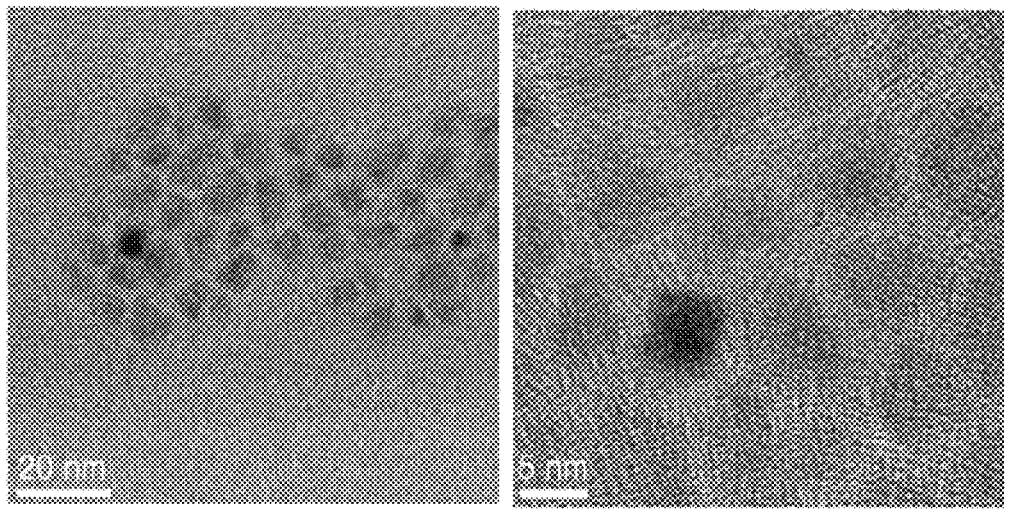
FIG. 3A shows TEM images of quantum dots prepared utilizing a preparation method according to an embodiment.
Figure 3B:
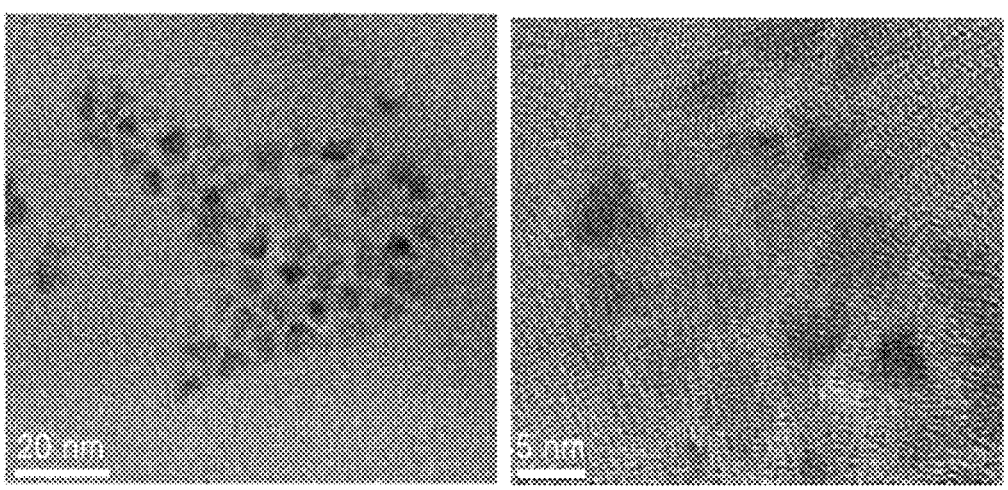
FIG. 3B shows TEM images of quantum dots prepared utilizing a preparation method according to an embodiment.

FIGS. 3A and 3B are TEM images of quantum dots according to an embodiment having a InGaP/ZnSe/ZnS structure (with an InGaP core on which shells of ZnSe and ZnS are sequentially formed), where the InGaP core is added to the organic solvent at a concentration of 0.1 mM (FIG. 3A) and a concentration of 100 mM (FIG. 3B).

As a result of analysis of the TEM images of FIGS. 3A and 3B and calculation, the quantum dots prepared by addition of the InGaP core at 0.1 mM had an average sphericity of 0.9, and the quantum dots prepared by addition of the InGaP core at 100 mM had an average sphericity of 0.7. Accordingly, it may be confirmed that the quantum dots prepared utilizing the preparation method according to an embodiment have a high sphericity of 0.7 or more.

In one or more embodiments, the first precursor may include trioctylphosphine-selenide (TOP-Se), tributylphosphine-selenide, triphenylphosphine-selenide, or any combination thereof. For example, the first precursor may include trioctylphosphine-selenide, but is not limited thereto.

In one or more embodiments, the third precursor may include trioctylphosphine-sulfide (TOP-S), tributylphosphine-sulfide, triphenylphosphine-sulfide, or any combination thereof. For example, the third precursor may include trioctylphosphine-sulfide, but is not limited thereto.

In one or more embodiments, the second precursor and the fourth precursor may each independently be or include a compound including a Group II element. For example, the second precursor and the fourth precursor may each independently be or include zinc oleate, zinc acetate, zinc acetylacetonate, zinc stearate, or any combination thereof, but are not limited thereto.

In one or more embodiments, the method of preparing the quantum dot 10 may further include adding a zinc precursor to the first mixture. For example, the zinc precursor may be or include zinc oleate, zinc acetate, zinc acetylacetonate, zinc stearate, or any combination thereof, but is not limited thereto.

The zinc precursor is not a constituent material of the core 10a, but may adhere to the surface of the core 10a to eliminate surface defects of the core 10a, and thus minimize or reduce a lattice defect with the first shell 10b to be formed.

In one or more embodiments, to maintain the first mixture in a vacuum state, the method may further include adding a zinc precursor to the first mixture and degassing at a temperature of 110° C. or higher.

The synthesis method utilized for the first shell 10b may be any suitable method in the art.

In one or more embodiments, the forming of the first shell 10b may be carried out in a temperature range of about 240° C. to about 340° C. For example, the forming of the first shell 10b may be carried out in a temperature range of about 260° C. to about 320° C.

The synthesis method utilized for the second shell 10c may be any suitable method in the art.

In one or more embodiments, the forming of the second shell 10c may be carried out in a temperature range of about 240° C. to about 340° C. For example, the forming of the second shell 10c may be carried out in a temperature range of about 260° C. to about 320° C.

As such, by forming the second shell 10c, the quantum dot 10 having a core-shell structure in which the first shell 10b and the second shell 10c are sequentially formed on the surface of the core 10a may be prepared.

The method of preparing the quantum dots 10 may further include, after the forming of the second shell 10c, purifying the synthesized quantum dots 10. The purification may be carried out utilizing chloroform, ethanol, acetone, or any combination thereof.

Optical Member

According to another aspect, provided is an optical member including the quantum dots 10.

The optical member may be a color conversion member. Because the color conversion member includes the quantum dot 10 having excellent or suitable light conversion efficiency as described above, the color conversion member may have excellent or suitable light conversion efficiency.

The color conversion member may include a substrate and a pattern layer formed on the substrate.

The substrate may be or act as a substrate of the color conversion member by itself, or may be an element of an apparatus (for example, a display apparatus) further including the color conversion member. The substrate may be a glass, silicon (Si), silicon oxide ($SiO_x$), and/or polymer substrate. The polymer substrate may be polyethersulfone (PES) and/or polycarbonate (PC).

The pattern layer may be or include the quantum dots 10 in the form of a thin film. For example, the pattern layer may be or include quantum dots 10 in the form of a thin film.

The color conversion member including the substrate and the pattern layer may further include a partition wall or a black matrix formed between each pattern layer. In some embodiments, the color conversion member may further include a color filter to further improve light conversion efficiency.

The color conversion member may include a red pattern layer capable of emitting red light, a green pattern layer capable of emitting green light, a blue pattern layer capable of emitting blue light, or any combination thereof. The red pattern layer, the green pattern layer, and/or the blue pattern layer may be implemented by controlling a component, a composition, and/or a structure of the quantum dots 10.

For example, the quantum dots 10 in the color conversion member may be to absorb a first light and emit a second light different from the first light. For example, the quantum dots 10 may be to absorb blue light and emit visible light other than blue light, for example, visible light having a maximum emission wavelength of 495 nm to 750 nm. Accordingly, the color conversion member including the quantum dots 10 may be designed to absorb blue light and emit wavelengths of a variety of color ranges.

For another example, the quantum dots 10 in the color conversion member may be to absorb blue light and emit green light having a maximum emission wavelength of 495 nm to 570 nm. Thus, the color conversion member including the quantum dots 10 may implement green color having a high luminance and a high color purity.

Electronic Device

The quantum dots 10 may be included in a variety of electronic devices. For example, an electronic device including the quantum dots may be a light-emitting device, an authentication device, and/or the like.

The electronic device may further include a light source. The quantum dots 10 may be arranged in an optical path of light emitted from the light source.

In other embodiments, the electronic device may include a light source and a color conversion member, wherein the color conversion member may include the quantum dots 10. The color conversion member may be arranged in (e.g., to intersect) an optical path of light emitted from the light source.

In this case, the fact that the color conversion member is located in at least one travel direction of light emitted from the light source does not exclude the case of other elements being further included between the quantum dots 10 or the light conversion member and the light source.

For example, a polarizing plate, a liquid crystal layer, a light guide plate, a diffusing plate, a prism sheet, a microlens sheet, a luminance enhancing sheet, a reflective film, a color filter, or any combination thereof may be disposed between the light source and the quantum dots 10 or between the light source and the color conversion member.

As another example, a polarizing plate, a liquid crystal layer, a light guide plate, a diffusing plate, a prism sheet, a microlens sheet, a luminance enhancing sheet, a reflective film, a color filter, or any combination thereof may be disposed on the quantum dots 10 or the color conversion member.

The light source may be a back light unit (BLU) utilized in a liquid crystal display (LCD), a fluorescent lamp, a light-emitting diode (LED), an organic light-emitting device (OLED), or a quantum dot light-emitting device, but is not limited thereto.

The light emitted from a light source as described above may undergo light conversion while passing through the quantum dots 10. For example, the quantum dots 10 may be to absorb a first light emitted from the light source and emit visible light different from the first light. For example, the quantum dots 10 may be to absorb blue light emitted from the light source and emit visible light having a maximum emission wavelength of 495 nm to 750 nm. Accordingly, the quantum dots 10 or a color conversion member including the quantum dots 10 may be designed to absorb blue light emitted from the light source and emit wavelengths in a variety of color ranges.

For example, the quantum dots 10 may be to absorb blue light emitted from the light source and emit green light having a maximum emission wavelength of 495 nm to 570 nm. For another example, the quantum dots 10 may be to absorb blue light emitted from the light source and emit red light having a maximum emission wavelength of 630 nm to 750 nm. Accordingly, the quantum dots 10 or the color conversion member including the quantum dots 10 may be to absorb blue light emitted from the light source and implement green or red color having a high luminance and a high color purity.

Hereinafter, embodiments of the quantum dots 10 and the method of preparing the same will be described in greater detail through the following examples and/or comparative examples.

EXAMPLES

Preparation Example 1

Preparation of InGaP Core

An indium precursor and 80 wt %-200 wt % of a gallium precursor with respect to the indium precursor were mixed in a microwave reaction tube, and a tris(trimethylsilyl)phosphine diluted to 20 wt % was added thereto and irradiated with microwaves for 7 minutes. The reaction temperature was 280° C. After the reaction product was cooled down to room temperature, the reaction product was purified twice with 5 mL toluene and 30 mL of acetone by centrifugation to obtain an InGaP core with 26 atomic % of Ga/In. The resulting InGaP core was dispersed in toluene.

Growth of ZnSe Shell (First Shell)/ZnS Shell(Second Shell)

InGaP crystals dispersed in toluene were added at a concentration of 0.5 mM into a reaction flask containing 80 mL of trioctylamine, and 4.9 mmol of zinc oleate was added thereto and then dispersed by ultrasonication to prepare a first mixture. Subsequently, the first mixture was degassed at 110° C. and maintained in a vacuum state.

4.5 mmol of TOP-Se and 18.0 mmol of zinc oleate were added into the reaction flask in a nitrogen atmosphere to prepare a second mixture. Then, the reaction flask was heated to 320° C. and reacted for 60 minutes. Subsequently, 22.4 mmol of TOP-S and 9.6 mmol of zinc oleate were added into the reaction flask to prepare a third mixture. Then, the reaction flask was heated to 320 ° C. and reacted for 90 minutes.

After termination of the reaction, the reaction flask was cooled down to room temperature. Subsequently, the crude product was purified once with 5 mL of toluene and 30 mL of ethanol by centrifugation to obtain a green quantum dot composition. The prepared quantum dots had an InGaP/ZnSe/ZnS structure.

Preparation Examples 2 and 3

Quantum dot compositions were prepared in substantially the same manner as in Preparation Example 1, except that the atomic percentages of Ga/In in the InGaP cores of Preparation Examples 2 and 3 were 45 atomic % and 55 atomic %, respectively.

Preparation Example 4

Preparation of InGaP Core

After growing an InGaP core having 26 atomic % of Ga/In in substantially the same manner as in Preparation Example 1, the reaction solution was rapidly cooled down to room temperature, and acetone was added thereto and centrifuged. The resulting precipitate was dispersed in toluene.

Growth of ZnSe Shell (First Shell)/ZnS Shell (Second Shell)

InGaP crystals dispersed in toluene were added at a concentration of 0.1 mM into a reaction flask containing 80 mL of trioctylamine, and 4.8 mmol of zinc oleate was added thereto and then dispersed by ultrasonication to prepare a first mixture. Subsequently, the first mixture was degassed at 110° C. and maintained in a vacuum state.

4.5 mmol of TOP-Se and 18.0 mmol of zinc oleate were added into the reaction flask in a nitrogen atmosphere to prepare a second mixture. Then, the reaction flask was heated to 320° C. and reacted for 60 minutes. Subsequently, 22.4 mmol of TOP-S and 9.6 mmol of zinc oleate were added into the reaction flask to prepare a third mixture. Then, the reaction flask was heated to 320° C. and reacted for 90 minutes.

After termination of the reaction, the reaction flask was cooled down to room temperature. Subsequently, the crude product was purified once with 5 mL of toluene and 30 mL of ethanol by centrifugation to obtain a green quantum dot composition. The prepared quantum dots had an InGaP/ZnSe/ZnS structure.

Preparation Examples 5 to 8

Quantum dot compositions were prepared in the substantially same manner as in Preparation Example 4, except that the InGaP crystals dispersed in toluene were added at a concentration of 1 mM, 10 mM, 50 mM, and 100 mM, respectively, to prepare first mixtures for Preparation Examples 5 to 8.

Preparation Examples 9 to 13

Quantum dot compositions having an atomic percentage of Se/In and an atomic percentage of S/In as shown in Table 1 were prepared in substantially the same manner as in Preparation Example 1, except that the InGaP crystals (Ga/In=26 atomic %) dispersed in toluene were added in amounts as shown in Table 1. In Table 1, the atomic percentage of Se/In and the atomic percentage of S/In are expressed as percentages based on (e.g., relative to) 50 atomic % of Se/In and 50 atomic % of S/In, respectively.

TABLE 1

|  | Added amount of InGaP (mmol) | Se/In atomic percentage (%) | S/In atomic percentage (%) |
| --- | --- | --- | --- |
| Preparation Example 9 | 0.5 mmol | 100% | 100% |
| Preparation Example 10 | 0.5 mmol | 75% | 70% |
| Preparation Example 11 | 0.5 mmol | 50% | 40% |
| Preparation Example 12 | 0.5 mmol | 30% | 25% |
| Preparation Example 13 | 0.5 mmol | 15% | 10% |

Evaluation Example 1: Experiment on Change in Shell Characteristics with Respect to Amount of Ga Element in InGaP Core UV-Vis absorption spectra of InGaP cores (having a core diameter of 2.5 nm) with 26 atomic %, 45 atomic %, or 55 atomic % of Ga/In were analyzed to obtain first exciton absorption peak wavelengths, respectively. The results are shown in Table 2.

TABLE 2

| Ga/In atomic percentage (%) | 26% | 45% | 55% |
| --- | --- | --- | --- |
| First exciton absorption peak wavelength (nm) | 430 | 405 | 390 |

A valley-to-peak (V to P) ratio was obtained from the absorption spectra of the InGaP cores (having a core diameter of 2.5 nm) having 26 atomic %, 45 atomic %, or 55 atomic % of Ga/In, and full widths at half maximum (FWHM) were obtained from the emission spectra of the InGaP cores. Line graphs of valley-to-peak (V to P) ratio and FWHM of the InGaP cores with respect to Ga/In atomic percentage are shown in FIG. 4.

Figure 4:
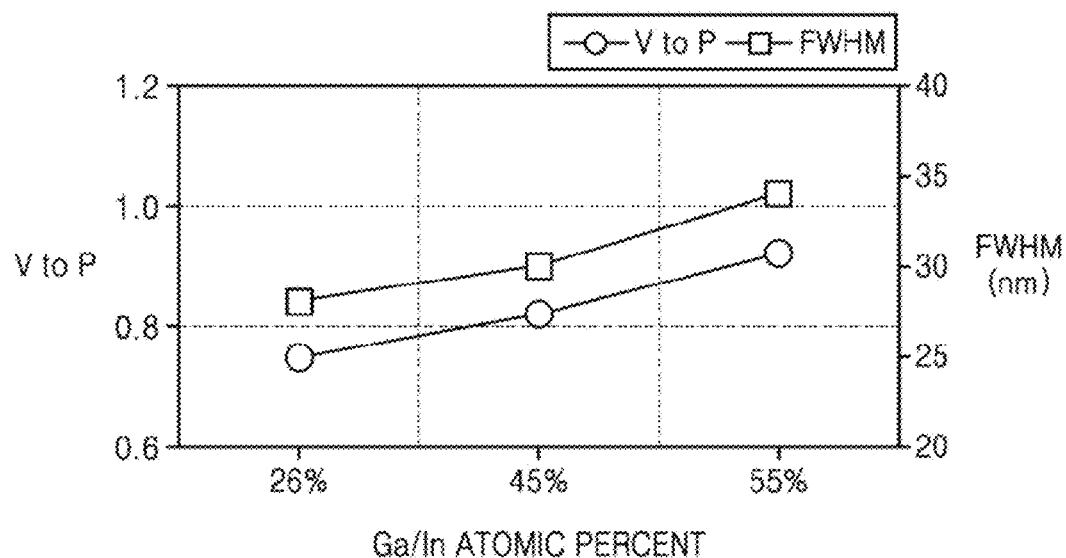
FIG. 4 shows line graphs of valley-to-peak ratio (V to P) in absorption spectra and full width at half maximum (FWHM) in photoluminescence spectra of quantum dots having InGaP cores with an atomic percentage (ratio) of 26 atomic %, 45 atomic %, or 55 atomic % of Ga/In, respectively.

Referring to FIG. 4, the InGaP core having a Ga/In atomic percentage of 26% according to embodiments of the present disclosure had a valley-to-peak ratio of about 0.75 and a very narrow FWHM of about 25 nm. Thus, the InGaP core of Preparation Example 1 was found to have a dense particle size distribution and energy band distribution, and have improved color purity.

Light emission spectra of the quantum dot compositions prepared in Preparation Examples 1 to 3 were measured to obtain quantum efficiencies, PL maximum emission wavelengths, and FWHMs. The results are shown in Table 3.

TABLE 3

|  | Ga/In atomic percentage (%) | Quantum efficiency (%) | PL Maximum emission wavelength (nm) | FWHM (nm) |
| --- | --- | --- | --- | --- |
| Preparation Example 1 | 26% | 91.9% | 530 | 38.1 |
| Preparation Example 2 | 45% | 80.1% | 524 | 38.9 |
| Preparation Example 3 | 55% | 67.1% | 521 | 41.1 |

From Table 3, it was found that the quantum dot composition of Preparation Example 1 exhibited a higher quantum efficiency than the quantum dot compositions of Preparation Examples 2 and 3, and had a PL maximum emission wavelength of 530 nm and a relatively narrow FWHM.

Evaluation Example 2: Measurement of Weight Absorption Coefficient with Respect to InGaP Core Concentration Absorbance of the quantum dot compositions prepared in Preparation Examples 4 to 8 were measured utilizing an Agilent Cary 300 Bio UV-Vis Spectrophotometer with a cuvette having a 10-mm optical path length and filled with 10 ppm of a solution, and weight absorption coefficients ($mL \cdot g^{-1} \cdot cm^{-1}$) at a wavelength of 450 nm were calculated according to the Lambert-Beer law. The results are shown in Table 4.

TABLE 4

|  | Added concentration of InGaPn (mM) | Weight absorption coefficient (nm) ($mL \cdot g^{-1} \cdot cm^{-1}$) |
| --- | --- | --- |
| Preparation Example 4 | 0.1 mM | 361 |
| Preparation Example 5 | 1 mM | 442 |
| Preparation Example 6 | 10 mM | 562 |
| Preparation Example 7 | 50 mM | 734 |
| Preparation Example 8 | 100 mM | 880 |

Referring to Table 4, it was found that the quantum dot compositions prepared in Preparation Examples 4 to 8 exhibited a weight absorption coefficient of 350 mL·g$^{-1}$·cm$^{-1}$ or greater at a wavelength of 450 nm.

Figure 5:
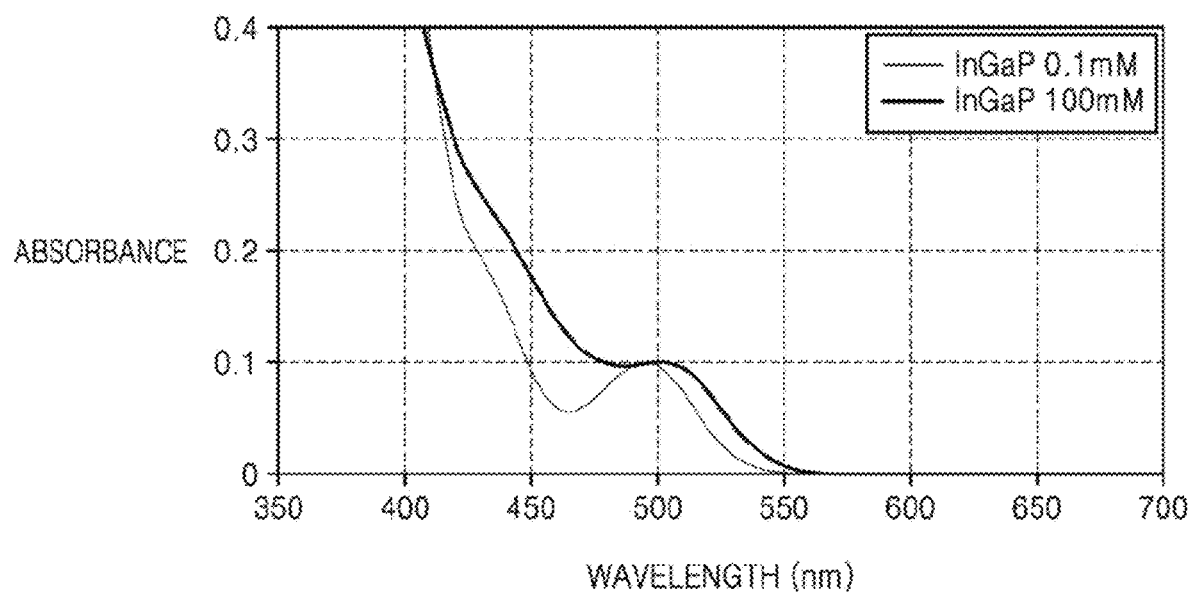
FIG. 5 shows absorbance with respect to wavelength (e.g., absorption spectra) of quantum dot compositions prepared in Preparation Examples 4 and 8.

Absorbance graphs of the quantum dot compositions prepared in Preparation Examples 4 and 8 (0.1 mM and 100 mM) are shown in FIG. 5. It was found from FIG. 5 that as the concentration of the InGaP crystals added to prepare quantum dots increased, the weight absorption coefficient increased and the absorbance increased.

Evaluation Example 3: Measurement of Weight Absorption Coefficient with Respect to Se/In and S/In Atomic Percentage Weight absorption coefficients of the quantum dot compositions prepared in Preparation Examples 9 to 13 were calculated in substantially the same manner as in Evaluation Example 2. The results are shown in Table 5.

In Table 5, the atomic percentage of Se/In and the atomic percentage of S/In are expressed as percentages based on (e.g., relative to) 50 atomic % of Se/In and 50 atomic % of S/In, respectively.

TABLE 5

|  | Se/In atomic percentage (%) | S/In atomic percentage (%) | Weight absorption coefficient (@450 nm) (mL · g$^{-1}$ · cm$^{-1}$) |
| --- | --- | --- | --- |
| Preparation Example 9 | 100% | 100% | 354 |
| Preparation Example 10 | 75% | 70% | 424 |
| Preparation Example 11 | 50% | 40% | 529 |
| Preparation Example 12 | 30% | 25% | 683 |
| Preparation Example 13 | 15% | 10% | 985 |

Referring to Table 5, it was found that the quantum dot compositions prepared in Preparation Examples 9 to 13 exhibited a high weight absorption coefficient of 350 mL·g$^{-1}$·cm$^{-1}$ or greater at a wavelength of 450 nm.

As described above, the quantum dots according to one or more embodiments of the present disclosure have a high sphericity and a high weight absorption coefficient, and thus, when a small content (amount) is utilized in an optical member, high luminescence efficiency may be obtained, and the quantum dots may be economical. An electronic device including the quantum dots may achieve excellent or suitable color reproducibility.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that various suitable changes in form and details may be made therein without departing from the spirit and scope of the disclosure, as defined by the following claims and equivalents thereof.

What is claimed is:

1. A quantum dot comprising:
    a core comprising a Group III-V semiconductor compound alloyed with gallium (Ga);
    a first shell around the core; and
    a second shell around the first shell,
    wherein the first shell comprises a first compound, which comprises a Group II-VI semiconductor compound, a Group III-V semiconductor compound, or a Group III-VI semiconductor compound,
    the second shell comprises a second compound, which comprises a Group II-VI semiconductor compound, a Group III-V semiconductor compound, or a Group III-VI semiconductor compound, and the first compound and the second compound are different from each other,
    an atomic percentage of gallium in the core to the Group III element excluding Ga in the core is 25 atomic % to 30 atomic %,
    an atomic percentage of the Group V or VI element in the first shell to the Group III element in the core is 5 atomic % to 50 atomic %, and
    an atomic percentage of the Group V or VI element in the second shell to the Group III element in the core is 5 atomic % to 50 atomic %.

2. The quantum dot of claim 1, wherein the Group III-V semiconductor compound alloyed with gallium in the core comprises InGaP.

3. The quantum dot of claim 1, wherein the Group II-VI semiconductor compound in the first shell and the second shell comprises ZnSe, ZnS, ZnTe, ZnO, ZnMgSe, ZnMgS or a combination thereof, the Group III-V semiconductor compound in the first shell and the second shell comprises GaP, GaAs, GaSb, InAs, InSb, AlP, AlAs, AlSb, or a combination thereof, and the Group III-VI semiconductor compound in the first shell and the second shell comprises GaSe, GaTe, or a combination thereof.

4. The quantum dot of claim 1, wherein the first shell comprises ZnSe and the second shell comprises ZnS.

5. The quantum dot of claim 1, wherein the first shell and the second shell each independently comprise a different Group II-VI semiconductor compound, an atomic percentage of the Group VI element in the first shell to the Group III element in the core is 10 atomic % to 15 atomic %, and an atomic percentage of the Group VI element in the second shell to the Group III element in the core is 10 atomic % to 15 atomic %.

6. The quantum dot of claim 1, wherein a weight absorption coefficient of the quantum dot is 350 to 1000 mL·g$^{-1}$·cm$^{-1}$ ata wavelength of 450 nm.

7. The quantum dot of claim 1, wherein the quantum dot has a quantum efficiency of 90% or greater.

8. The quantum dot of claim 1, wherein a maximum emission wavelength in a photoluminescence spectrum of the quantum dot is 520 nm to 530 nm.

9. The quantum dot of claim 1, wherein a full width at half maximum (FWHM) of a photoluminescence (PL) spectrum of the quantum dot is 40 nm or less.

10. The quantum dot of claim 1, wherein the quantum dot has a sphericity of 0.7 to 0.9.

11. The quantum dot of claim 1, wherein the first shell has a thickness of 0.5 nm to 3 nm, and the second shell has a thickness of 0.5 nm to 4 nm.

12. A method of preparing a quantum dot, the method comprising:

preparing a first mixture in which a core, which comprises a Group III-V semiconductor compound alloyed with gallium (Ga), is dispersed at a concentration of 0.1 mM to 100 mM in an organic solvent;

forming a first shell by reacting a second mixture in which a first precursor, which comprises a Group V element or a Group VI element, and a second precursor, which comprises a Group II element or a Group III element, are added to the first mixture; and forming a second shell by reacting a third mixture in which a third precursor, which comprises a Group V element or a Group VI element, and a fourth precursor, which comprises a Group II element or a Group III element, are added to the second mixture, wherein an atomic percentage of gallium in the core to the Group III element excluding Ga in the core is 25 atomic % to 30 atomic %, the first precursor and the third precursor are different from each other, the first shell comprises a first compound, which comprises a Group II-VI semiconductor compound, a Group III-V semiconductor compound, or a Group III-VI semiconductor compound, and the second shell comprises a second compound, which comprises a Group II-VI semiconductor compound, a Group III-V semiconductor compound, or a Group III-VI semiconductor compound.

13. The method of claim 12, wherein the Group III-V semiconductor compound alloyed with gallium comprises InGaP.

14. The method of claim 12, wherein the first precursor comprises trioctylphosphine-selenide (TOP-Se).

15. The method of claim 12, wherein the third precursor comprises trioctylphosphine-sulfide (TOP-S).

16. The method of claim 12, wherein the second precursor and the fourth precursor each independently comprise zinc oleate, zinc acetate, zinc acetylacetonate, zinc stearate, or any combination thereof.

17. The method of claim 12, wherein the forming of the first shell is performed in a temperature range of 240° C. to 340° C.

18. The method of claim 12, wherein the forming of the second shell is performed in a temperature range of 240° C. to 340° C.

19. An optical member comprising the quantum dot of claim 1.

20. An electronic device comprising the quantum dot of claim 1.

* * * * *